2,356,088

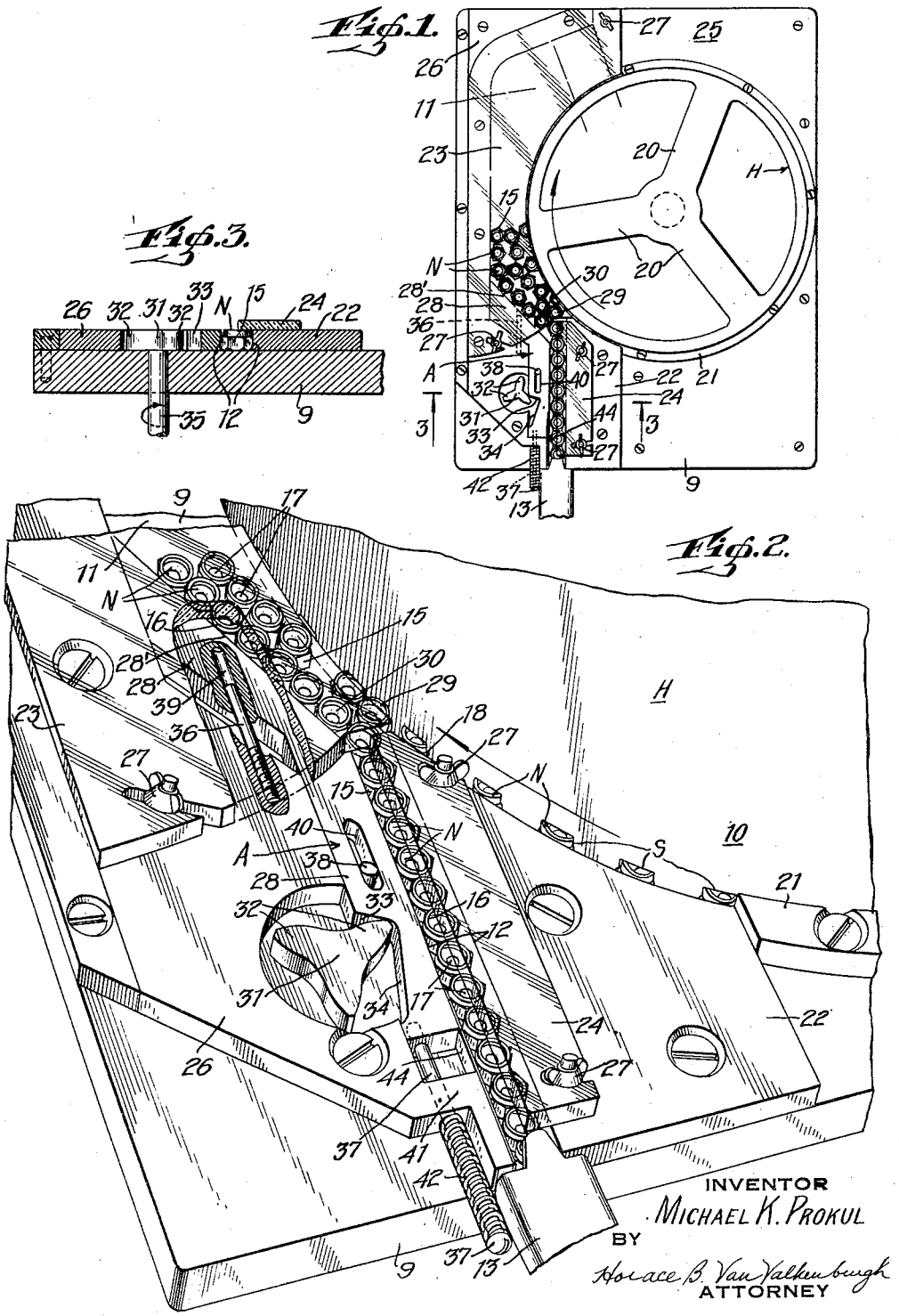
Aug. 15, 1944.  M. K. PROKUL  2,356,088
DISTRIBUTING APPARATUS
Filed April 20, 1943
INVENTOR
MICHAEL K. PROKUL
BY
Horace B. Van Valkenburgh
ATTORNEY Patented Aug. 15, 1944

UNITED STATES PATENT OFFICE 2,356,088

DISTRIBUTING APPARATUS

Michael K. Prokul, Maplewood, N. J., assignor to Elastic Stop Nut Corporation of America, a corporation of New Jersey Application April 20, 1943, Serial No. 483,816

7 Claims. (Cl. 10—170)

This invention relates to apparatus for distributing to one or more points, and in succession, a plurality of articles such as nuts or the like—and more particularly asymmetrical articles.

An example of a symmetrical article is a standard hex nut or blank therefor, wherein each end of the article is substantially identical. The bore of a standard hex nut is countersunk an equal distance at each end, and both ends may be countersunk simultaneously. Thus, it is immaterial whether one or the other end of the nut is uppermost when the nut is fed to a countersinker, or to a tapper. However, asymmetrical articles present a considerably different problem.

An example of an asymmetrical article is a type of lock nut used extensively in aircraft and other industries, wherein a well is provided adjacent one end of a threaded bore, and the sides of the well are closed over onto a locking washer or insert, which is formed of fiber or the like. The fiber insures that the bolt and nut threads will stay in frictional engagement, and thus prevents the nut from loosening, even during severe vibration. This lock nut is countersunk at only one end—opposite the washer well—and blanks for such nuts must be fed to a countersinker in one position only. Also, because the washer well causes the point at which tapping will begin and end to differ considerably in height, when the nut blank is tapped from one end as compared with the opposite end, it is necessary that each blank be fed to a tapper in the same relative position. Consequently, the devices used for feeding or distributing symmetrical articles, such as standard nut blanks, to tappers, countersinkers, and the like, are not suitable for use with asymmetrical articles, such as the lock nut described above.

A rotating cylindrical hopper, provided with slots or openings which correspond to the asymmetrical shape of the article—and which is mounted on a bed inclined at an angle, such as 45°, to the horizontal—is useful in distributing such articles to one or more inclined chutes which carry the articles to a countersinker, tapper, or the like. As the articles are tumbled about in the hopper rotating in, say, a clockwise direction, those articles which enter the slots slide through into a passage which carries a supply of articles all arranged in the desired position. The feed chutes lead from the lower end of this passage or space, which extends along the "up" side of the hopper. However, there is a considerable tendency for the articles to form jams which prevent the free flow of articles down the chute or chutes. When a jam occurs, the supply of articles to the countersinker, tapper, or the like will soon be shut off, unless the operator notices and clears the jam, but more often than not, the machine must be stopped to clear the jam. Thus, such jams tend to interfere seriously with production, and in instances take sufficient of an operator's time, so that the number of machines one operator can handle is seriously reduced, even though the machines are substantially completely automatic.

A primary object of this invention is to provide means for preventing and breaking up nut jams occurring immediately outside a selective hopper of the above type.

Further objects of this invention include the provision of an improved apparatus for distributing nuts and the like to a machine in which a tool operation, such as tapping, countersinking, or the like, is performed; the provision of such apparatus which includes a selective hopper and means for positively agitating the articles to prevent jams in the passageway immediately outside the hopper; to provide such apparatus which will operate substantially automatically to clear jams as they occur; and the provision of such apparatus which is relatively simple in construction and readily adaptable to different feed chutes and hopper arrangements.

Other objects and novel features of this invention will become apparent from the following description and accompanying drawing, in which:

Fig. 1 is a plan view of a selective hopper and appurtenant parts, including agitating means, and comprising an embodiment of this invention;

Fig. 2 is an enlarged perspective view of a portion of the hopper and agitating means; and Fig. 3 is a cross-section taken along line 3—3 of Fig. 1, on an enlarged scale, showing a feed channel and an agitator cam.

An embodiment of this invention, as illustrated in the drawing, includes a hopper H, rotatable in the direction of the arrows of Figs. 1 and 2 and mounted on a base 9 which may be disposed at a suitable angle to the horizontal, such as 45°. Asymmetrical nut blanks N pass through and beneath open-ended gates or slots S in the bottom of a rim 10 of the hopper, and into a space or passage 11, beginning at a point near the lower end of the hopper. Passage 11 extends in the direction of rotation of the hopper to a point adjacent the upper end of the hopper, and holds a supply of nut blanks for a channel 12 leading to a chute 13. Chute 13, in turn, may lead to mechanism for countersinking the lower end of the bore, or for tapping the bore of the nut blank, such as of the character disclosed and claimed in my copending application Serial No. 480,167, filed March 23, 1943.

With the base 9 inclined at an angle, for instance, of substantially 45°, the nut blanks tend to collect in the lower half of the hopper, being carried upwardly along the left side of the hopper as it rotates in a clockwise direction, as shown. Also, the blanks slide by gravity through channel 12 into chute 13, which is also inclined at a suitable angle for gravity flow.

Each nut blank N, as in Figs. 1 and 2, comprises a lower hexagonal portion 15, and, at one end thereof, a washer well 16, the sides of which are to be crimped over onto a locking washer formed of fiber or the like. Bore 17 of hexagonal portion 15 is adapted to be threaded, and the bottom of the bore is countersunk. For reasons pointed out previously, it is necessary that each successive nut be fed in the same position to a machine such as a countersinker, tapper, or the like.

So that the blanks will emerge from the hopper with the washer well uppermost, the distance between rim 10 of the hopper and base 9 is slightly greater than the height of hexagonal lower portion 15 of the nut blank for clearance purposes. Each slot S has sloping sides 18, and at the bottom is approximately the width of hexagonal portion 15 of the nut blank, but at the top is only slightly wider than the top of washer well 16, again for clearance purposes. Since only the washer well 16 can pass through a slot, the nut blank can emerge in only one position—i. e. with the washer well uppermost. There may be instances when it is desirable that rim 10 extend almost to base 9, and slots S conform substantially to the entire cross-sectional shape of the articles to be distributed.

For supporting the cylindrical rim 10, hopper H is provided with a plurality of radially extending arms 20, while the rim has sufficient height so that a desired quantity of nuts can be placed in the hopper at one time.

As the nut blanks tumble about in hopper H, due to rotation thereof—and, if desired, the additional agitation and stirring provided by scoops or plates attached to the inside of rim 10—each nut which is in the correct position to slip into one of the slots S tends to be pushed through the slot by the weight of the tumbling mass of nuts inside the hopper. If the nut tends to emerge from the gate around the periphery of a rim 21 or a block 22, for instance, it will be carried along until passage 11 at the end of block 22 is reached. Each nut blank which emerges into passage 11 from the slot makes room for the next nut seeking entrance therein from the inside of the hopper, and passage 11 theoretically will hold sufficient nut blanks to assure a substantially continuous supply for chute 13.

Base passage 11 and channel 12 are provided with cover plates 23 and 24, respectively, since the angle of base 9 is such that the nut blanks otherwise tend to fall out. The cover plates may be made of transparent material such as plastic, if desired, and are so shown to permit clarity of illustration of parts beneath. Cover plate 24 does not extend completely over channel 12, thus permitting access to the nut blanks by a suitable instrument, such as a small hook, should the operator so desire. Cover plate 23 extends to the hopper in one direction, and in the other direction to blocks 25 and 26, which bound the upper portion of passage 11.

Cover plate 23 may be secured to blocks 25 and 26 by wing nuts 27, while cover plate 24 may be similarly secured to block 22. Blocks 22, 25, and 26 may be secured to base 9 in any suitable manner, as by bolts or screws. Block 22 is adapted to form one side of channel 12, while block 26 would normally form the opposite side of channel 12, as well as the lateral wall of passage 11 opposite hopper H.

In accordance with this invention, agitating means A are provided adjacent the lower end of passage 11 for intermittently or substantially continuously moving the mass of nut blanks upwardly and downwardly. Agitating means A includes a block 28, which may form the lower inclined wall of passage 11 and a portion of the side wall of channel 12. The upper end of block 28 is inclined, as at 28′, at a suitable angle so that the nut blanks will be pushed upwardly as the block moves upwardly, but will follow the block down without becoming misaligned.

Although it appears that there sould be no difficulty in operation of a selective hopper as just described, it has been found by experience that the nut blanks tend to jam or pack at the entrance to channel 12. For instance, nut blanks 29 and 30 will tend to jam by bridging the entrance to the channel. However, the entrance to the channel is kept clear by block 28, which intermittently pushes the blanks in the position of blank 30, and those above it, upwardly, thus permitting relative freedom of movement of the blanks into channel 12. The reciprocations of block 28 need have no particular frequency or amplitude, but preferably occur with sufficient frequency and relative velocity that a relatively steady flow of blanks through channel 12 into chute 13 is produced. In general, the faster the rate of withdrawal from chute 13, the faster the desired frequency of reciprocation.

For imparting to block 28 the above desired type of movement, a rotating cam 31 is provided with a plurality of leaves 32, such as three, for successively engaging an inclined shoulder 33. The inclined shoulder lies at the top of a cutaway portion 34 of block 28, which permits the cam leaves to move freely until they strike the shoulder. The cam is rotated at a suitable rate by a shaft 35, which may be connected to a conventional power source, and the block is guided by upper and lower studs 36 and 37, respectively, and a pin 38. Upper stud 36 slides in a hole 39 in the upper portion of block 28, while pin 38 engages a slot 40 formed in the mid portion of the block. Stud 36 may be attached to block 26 by threadedly engaging a tapped longitudinal hole therein, as shown, or in any other suitable manner, and pin 38 may similarly be secured to base 9. Lower stud 37, which may take the form of a relatively long machine pin, as shown, extends through a lower arm 41 of block 26 and carries a compression spring 42. Spring 42 is placed on the stud; the stud is inserted through the hole in arm 42; and the end is then fastened in a hole in the lower end of block 28, as by a pin or threading. Through the guiding studs and pins, block 28 may be reciprocated at a relatively rapid rate without jamming or becoming misaligned.

Leaves 32 of cam 31 merely raise block 28, while the force of gravity and spring 42 pull the block back down as soon as a leaf 32 has left shoulder 33. In the position shown in Fig. 2, the cam 31 will rotate only a few more degrees before the leaf engaging shoulder 33 will leave the shoulder, and spring 42 will pull block 28 back down.

So that the nut blanks will feed more readily down channel 12, a guide strip 44 is secured at its lower end to arm 41 of block 26, as in Fig. 2. Strip 44 extends upwardly a sufficient distance effectively to bridge the gap between arm 41 and the opposite side of the recess in block 28 when the latter is in its highest position. The strip need not be very thick, as there is little stress upon it, and it merely forms a portion of the wall of channel 12 for a short period of time. However, the strip preferably has sufficient length to be supported at least at each end at all times.

It will be evident from the foregoing that the continuous reciprocation of the agitating means A results in a relatively even distribution of the nuts to the feed chute. Thus, jams adjacent the entrance of channel 12, otherwise of frequent occurrence, rarely occur in the case of apparatus constructed in accordance with this invention.

Although an embodiment of this invention has been illustrated and described as distributing nut blanks through one feed chute, it will be understood that a plurality of chutes may be utilized. Also, it will be understood that the apparatus of this invention is useful in distributing articles other than nuts to machines or the like, and is further useful in distributing symmetrical articles, such as blanks for standard hex nuts.

Although the agitating means, included in an embodiment of this invention, has been illustrated and described as mechanically operated, it will be understood that it may be operated hydraulically, electrically, or in any other suitable manner, and that a timing device may be provided which determines the rate and period of reciprocation. In addition, spring 42 may be placed between pin 38 and the lower end of slot 40, or in any other suitable place; different forms of springs may be used; and other means operating to pull block 28 downwardly may be utilized instead of a spring.

Also, it will be understood that channel 12 may be considered as a continuation of passage 11; that the lower end of block 28 may form all or only a small portion of the wall of channel 12; and that block 28 may be altered in size and shape.

It will be further understood that the principles of this invention may be applied in various ways; and that apparatus constructed in accordance with this invention need not take the form illustrated and described, but the invention may be embodied in numerous different forms and in many different ways, all without departing from the spirit and scope of this invention, as defined in the appended claims.

What is claimed is:

1. In apparatus for relatively evenly distributing articles such as nuts or the like to a feed chute, a base disposed at an angle to the horizontal; a rotatable selective hopper mounted on said base, said hopper being provided about its bottom periphery with a plurality of open-ended slots conforming in shape to at least a portion of the cross-section of said articles; a substantially enclosed passage disposed about a portion of said hopper, said passage extending from a point adjacent the lowest point of the bottom periphery of said hopper and up alongside said hopper, in a direction corresponding to the direction of rotation of said hopper; at least one fed chute; at least one channel leading from the lower end of said passage to a feed chute; a reciprocable block forming the lower wall of said passage, said block having a cut-away section providing a shoulder; and a rotating cam having a plurality of leaves for successively engaging said shoulder.

2. In apparatus as defined in claim 1, wherein each leaf of said cam moves said block upwardly, and including resilient means for pulling said block downwardly.

3. In apparatus as defined in claim 1, wherein said block forms at least a portion of the side wall of said channel, and including a strip for bridging the gap between the lower end of said block and the remainder of the side wall of said channel during movement of said block.

4. Apparatus for distributing nuts or the like, comprising a base disposed at an angle to the horizontal; a rotatable selective hopper mounted on said base, said hopper being provided about its bottom periphery with a plurality of open-ended slots conforming in shape to at least a portion of the cross-section of the article to be distributed; a passage extending around a portion of said hopper, from a point adjacent the lower end and up alongside said hopper, in a direction corresponding to the direction of rotation of said hopper; a channel leading from the lower end of said passage; a cover for said passage; a reciprocable block forming at least a portion of the lower wall of said passage and at least a portion of one side wall of said channel; fixed blocks attached to said base and forming the remainder of the wall of said passage opposite said hopper and the remaining walls of said channel; means for reciprocating said first block; and means for guiding said block during reciprocation.

5. Apparatus as defined in claim 4, wherein said guiding means includes a substantially vertically disposed stud at the upper and lower ends of said block, and said reciprocating means includes a cam for moving said block upwardly and a coil spring for moving said block downwardly, said spring surrounding said stud at the lower end of said block.

6. Apparatus as defined in claim 4, wherein the upper edge of said reciprocable block is inclined at an angle downwardly toward said hopper and said channel.

7. Apparatus for distributing nuts or the like, comprising a base disposed at an angle to the horizontal, a rotatable selective hopper mounted on said base, said hopper being provided about its bottom periphery with a plurality of open-ended slots conforming in shape to at least a portion of the cross-section of said nuts or the like, a substantially enclosed passage extending around a portion of said hopper, from a point adjacent the lower side of said hopper and upwardly alongside said hopper, in a direction corresponding to the direction of rotation of said hopper, a cover for said passage, a reciprocable block forming at least a portion of the lower wall of said passage, including means for positively and intermittently moving said block upwardly and resilient means for moving said block downwardly.

MICHAEL K. PROKUL.